Patented Sept. 16, 1941

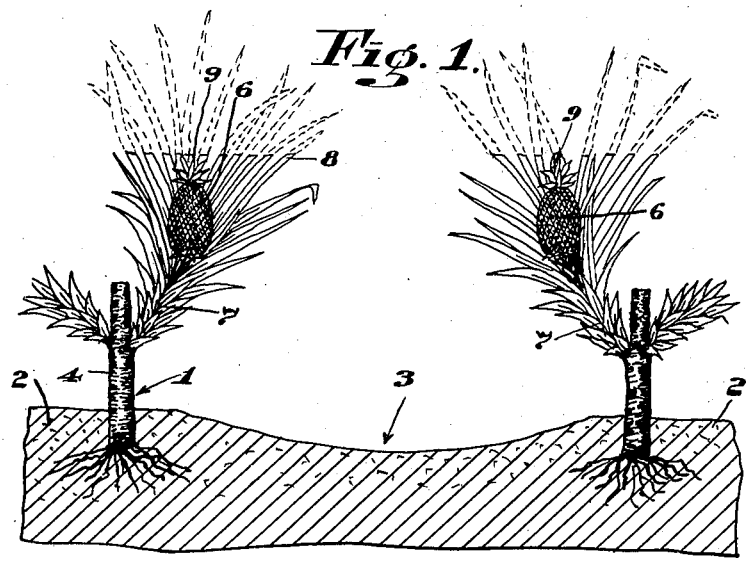
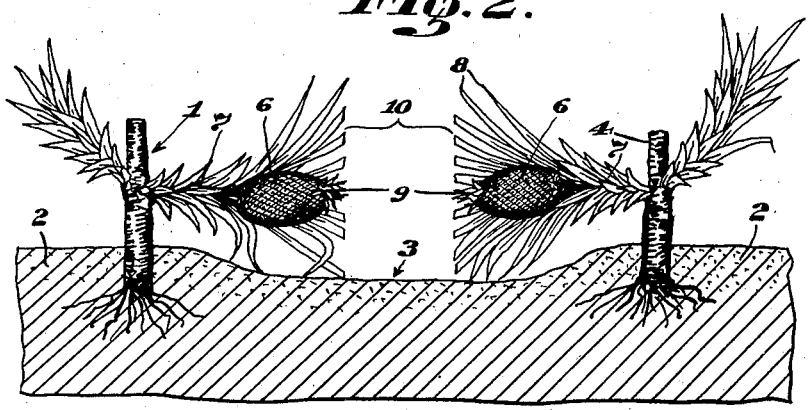

2,256,254

UNITED STATES PATENT OFFICE 2,256,254

METHOD FOR THE CULTURE OF PINEAPPLE PLANTS BEARING A RATOON CROP

Walter A. Wendt, Wahiawa, Territory of Hawaii, assignor to Hawaiian Pineapple Company, Limited, Honolulu, Territory of Hawaii, a corporation of the Territory of Hawaii Application December 13, 1939, Serial No. 309,020

2 Claims. (Cl. 47—58)

The present invention relates to the cultivation of plants, more particularly to the cultivation of pineapple plants.

In pineapple culture it is customary to grow a primary crop known as the "plant crop" and one or more secondary crops known as "ratoon crops." In the plant crop, the fruit is borne on the main stump of the plant in a more or less upright position. The ratoon crops, however, are borne on suckers or branches which grow out of the main stump at an angle thereto. As the fruit approaches maturity and becomes heavy, these fruit-bearing suckers bend or partially break off at their point of juncture with the main stump and careen down to or adjacent the ground. The outer leaves of these careened suckers of adjacent plants become entangled with the result that the whole field is covered with a mat of enmeshed leaves. This condition exists only to a limited degree within the pineapple beds, occurring mainly in the cultivation paths between the beds which, for economic reasons, cannot be made broad enough to prevent entanglement of the foliage of suckers careening therein from the bordering rows of plants.

This leaf entanglement of the plants, particularly in the cultivation paths or aisles, presents a serious problem. The fruit are so obscured in the mass of tangled foliage that the pickers have difficulty in locating them and are likely to tread upon the fruit hidden in the tangle of foliage lying in the paths. The pickers have difficulty in forcing their way through the tangled paths and the speed of travel is reduced. In addition to the increase in picking time thus occasioned, losses in ratoon fruit overlooked or trampled run as high as three tons of fruit per acre.

It is an object of the present invention to provide a method for treating the ratoon bearing plants which will, in large measure, overcome the above mentioned and other difficulties which have heretofore arisen from the careening of the ratoon suckers. A further object of the invention is to provide such a method which is economical in application, in that the savings in fruit losses and pickers' time greatly exceed its cost, and which does not interfere with or impair the normal development of the ratoon fruit. These and other objects and advantages of the invention will be apparent from the following more particular description and from the accompanying drawing wherein:

Fig. 1 is an elevational view of portions of a pair of pineapple plants at opposite sides of a cultivation path, showing a pair of ratoon-fruit-bearing suckers in an upright condition prior to careening with portions of the upper foliage, indicated by dotted lines, trimmed off in accordance with the invention.

Fig. 2 is an elevational view of the plant portions shown in Fig. 1 after careening of the suckers.

The two figures of the accompanying drawing represent a conventional planting of pineapples wherein the plants 1 are located in beds 2, the beds 2 being separated by cultivation paths or aisles 3. The rows of plants in the beds are usually spaced apart eighteen inches or more and there may be two or more rows to a bed. The aisles 3 separating the beds are generally from three to four feet wide.

Referring to Fig. 1, it will be seen that the plants have a main stump 4 on the top of which the primary pineapple (not shown) grows in more or less upright position. The ratoon fruit 6, on the other hand, are borne on the outer ends of branches or suckers 7 which grow up at an angle out of the main stump 4. A number of these suckers grow from a single stump and from one to three may bear fruit in any given ratoon crops. Leaves 8 grow out of these suckers 7 as well as from the main stump 4, extending up around the fruit 6 and, in many instances, considerably beyond the crown of the fruit, concealing the fruit except when viewed from directly above.

Until the fruit 6 is close to maturity, the suckers remain in more or less upright condition as shown in Fig. 1. However, when the fruit reaches maturity, its weight is so great that the suckers in most cases careen down to the ground, either breaking at their point of attachment to the main stump, as shown in Fig. 2, or bending or pulling over the main stump. This results in a welter of tangled vegetation not only within the beds 2, but also extending across the aisles 3 where the outer leaves of suckers careening into the aisles from the border rows intertwine. This tangling of the fallen suckers obscures the fruit, blocks the aisles and results in substantial difficulties and losses in harvesting.

In order to overcome these difficulties, it has heretofore been proposed to surround the beds with a network of wires which will support the suckers in upright position throughout the maturing of the ratoon fruit. But to install such supporting means properly is a difficult and painstaking task, so that the cost of labor and material makes this method uneconomical and even when properly applied, the method is of doubtful effectiveness in accomplishing its desired object.

The present invention dispenses with any need for such costly supporting equipment by providing a method for treating the plants, simple and economical to perform, so that the careening of the suckers bearing ratoon fruit, while proceeding as usual, does not present the difficulties to harvesting and the consequent losses heretofore entailed.

In accordance with the present invention, I trim off a portion of the leaves of the suckers, at least of the border rows of plants, so shortening at least the outermost leaves that suckers from plants at opposite sides of the aisles do not tangle but are separated by a substantial space constituting a path through which the pickers can readily walk without stepping on the fruit, and preventing the leaves from fully concealing the pineapples from view when the suckers are in a more or less horizontal position. I have found that with conventional plantings, it is sufficient both for forming the leaf-free paths in the aisles and for exposing the fruit to view if so much of the leaves as projects outwardly around and beyond the crown of the fruit is trimmed away. I have further discovered that, while any substantial trimming of the leaves in the early stages of development of the fruit results in a material reduction in the size of the fruit at maturity, no such result obtains if the trimming is done just prior to that stage in the development of the fruit when its size and weight careens the suckers, the fruit thereafter maturing as fully and as well as if the leaves had remained untouched.

In the preferred practice of the invention, therefore, I trim away so much of the leaves of at least the outwardly extending suckers of the border rows as extends beyond the crowns 9 of the fruit at a time just prior to the stage in the development of the fruit at which their weight will cause the suckers to careen, as shown in Fig. 1, the leaf portions cut away being indicated by dotted lines. Thereafter, when the suckers careen, those lying in the aisles 3 will, as shown in Fig. 2, be separated by a space or path 10 substantially free of entangled foliage, forming a ready passage for the pickers. Furthermore, the tips of the crowns, which continue to grow after the leaves have been trimmed, will project out beyond the ends of the cut leaves so that they can be readily seen by the pickers.

While the greatest benefits of the invention are derived from trimming the leaves of those suckers of aisle-bordering rows that careen into the aisles, it is also advantageous to trim in similar fashion the leaves of inwardly extending suckers of these rows and also of internal rows of suckers in case the beds 2 contain more than two rows of plants. In such case, tangling of the leaves of adjacent suckers is not altogether avoided as the spacing between rows within a bed is ordinarily considerably less than the width of the aisles, but the mass of tangled foliage is nevertheless considerably reduced in extent and furthermore the pineapples within the beds are much more readily seen by the pickers than before.

The trimming of the leaves, in accordance with the preferred practice of the invention, is a relatively simple and inexpensive matter, since the suckers are still in more or less upright position so that their outer leaves are readily accessible and the crowns easily visible for gauging the line of cut, so that no great amount of skill or time is required to perform the cutting operation. The proper time for cutting can be readily determined by the grower, as the age and size of the fruit at which careening of the suckers is likely to take place is well known, and the cutting should be done as closely before that stage as possible.

While it is important that the cutting of the leaves takes place at about the time previously indicated in order to avoid detriment to the size of the fruit, the amount of foliage removed is of less importance in this respect. While removal of so much of the leaves as projects beyond the crowns, in accordance with the preferred procedure, will ordinarily be found sufficient, more can be removed without injury to the normal development of the fruit.

I claim:

1. In a method for the culture of pineapple plants bearing a ratoon crop, the step which comprises trimming off at least so much of the leaves of fruit-bearing suckers of the plants as projects substantially beyond the crowns of the fruit growing on said suckers shortly prior to that stage in the development of the fruit when the suckers careen to the ground under the weight of the fruit, whereby to reduce the leaf entanglement of careening suckers of adjacent plants without impairing the normal development of the fruit.

2. In a method for the culture of pineapple plants bearing a ratoon crop, the step which comprises trimming down the leaves of fruit-bearing suckers of a pair of adjacent rows of the plants shortly prior to that stage in the development of the fruit when the suckers careen to the ground under the weight of the fruit, whereby to provide a substantially leaf-free aisle centrally of the space between said rows when said suckers careen therein, without impairing the normal development of the fruit.

WALTER A. WENDT.